United States Patent
Ikeda et al.

(10) Patent No.: US 12,119,964 B2
(45) Date of Patent: Oct. 15, 2024

(54) ELECTRONIC CONTROL DEVICE AND DETERMINATION METHOD

(71) Applicant: Hitachi Astemo, Ltd., Hitachinaka (JP)

(72) Inventors: Yasuhiro Ikeda, Tokyo (JP); Yutaka Uematsu, Tokyo (JP); Hideyuki Sakamoto, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/009,458

(22) PCT Filed: Feb. 26, 2021

(86) PCT No.: PCT/JP2021/007413
§ 371 (c)(1),
(2) Date: Dec. 9, 2022

(87) PCT Pub. No.: WO2021/256010
PCT Pub. Date: Dec. 23, 2021

(65) Prior Publication Data
US 2023/0239182 A1 Jul. 27, 2023

(30) Foreign Application Priority Data

Jun. 17, 2020 (JP) ................................. 2020-104806

(51) Int. Cl.
*H04L 25/03* (2006.01)
*H04B 3/04* (2006.01)

(52) U.S. Cl.
CPC ......... *H04L 25/03878* (2013.01); *H04B 3/04* (2013.01)

(58) Field of Classification Search
CPC ................. H04L 25/02; H04L 25/0264; H04L 25/03878; H04L 25/028; H04L 25/0286;
(Continued)

(56) References Cited

U.S. PATENT DOCUMENTS 5,497,113 A * 3/1996 Uber ................... H04L 25/0298
327/170
5,751,161 A * 5/1998 Wei ..................... H03K 19/0005
326/50
(Continued)

FOREIGN PATENT DOCUMENTS

JP   2004-48688 A    2/2004
JP   2011-158473 A   8/2011
(Continued)

OTHER PUBLICATIONS

International Search Report with English Translation and Written Opinion dated Jun. 1, 2021 in corresponding International Application No. PCT/JP2021/007413.
(Continued)

*Primary Examiner* — James M Perez
(74) *Attorney, Agent, or Firm* — Foley & Lardner LLP

(57) ABSTRACT

An electronic control device includes a receiving unit that receives a data signal from an external device via a transmission line, a determination criterion selection unit that determines a determination criterion based on transition information of a waveform in the data signal, and a condition determination unit that determines a condition of a communication system including the external device, the receiving unit, and the transmission line based on a transmission waveform characteristic in the data signal and the determination criterion.

7 Claims, 11 Drawing Sheets

(58) Field of Classification Search
CPC .......... H04L 25/0288; H04L 25/03885; H04L 2201/00; H04L 2201/02; H04L 2201/04; H04L 2201/06; H04L 2201/08; H04B 3/04; H04B 15/00; H04B 15/005; H04B 3/10; H04B 3/143; H04B 3/145; H04B 3/146–148
See application file for complete search history.

(56) References Cited

U.S. PATENT DOCUMENTS

| | | | | |
|---|---|---|---|---|
| 6,262,606 | B1* | 7/2001 | Tamjidi | H03K 19/018585 327/108 |
| 6,393,062 | B1* | 5/2002 | Furman | H04L 25/03885 375/252 |
| 6,448,815 | B1* | 9/2002 | Talbot | H04L 25/028 326/86 |
| 7,613,237 | B1* | 11/2009 | Talbot | H04L 7/0008 324/750.01 |
| 8,194,727 | B2* | 6/2012 | Yamazaki | H04L 7/02 375/232 |
| 8,395,411 | B2* | 3/2013 | Diffenderfer | H04L 25/0286 327/170 |
| 8,401,135 | B2* | 3/2013 | Beukema | H04L 7/0087 375/350 |
| 8,866,282 | B2* | 10/2014 | Ikeda | H05K 1/025 257/691 |
| 8,988,160 | B2* | 3/2015 | Ikeda | H04B 3/02 333/32 |
| 9,319,218 | B2* | 4/2016 | Pandey | H04L 25/0264 |
| 9,749,162 | B1* | 8/2017 | Mobin | H04L 25/03057 |
| 9,948,300 | B1* | 4/2018 | Greeff | H03K 19/00323 |
| 10,061,720 | B2* | 8/2018 | Ikeda | G06F 13/4022 |
| 10,128,843 | B2* | 11/2018 | Greeff | H03K 19/018521 |
| 10,194,443 | B2* | 1/2019 | Saeki | H04W 52/42 |
| 10,340,913 | B2* | 7/2019 | Greeff | H03K 19/0005 |
| 10,614,014 | B2* | 4/2020 | Ikeda | G06F 3/0629 |
| 10,687,336 | B2* | 6/2020 | Saeki | H04L 25/0288 |
| 11,096,174 | B2* | 8/2021 | Saeki | H04W 52/50 |
| 11,381,228 | B2* | 7/2022 | Matsumoto | H03K 17/16 |
| 11,388,032 | B1* | 7/2022 | Arai | H04L 25/03343 |
| 11,444,657 | B2* | 9/2022 | Uematsu | H04L 25/0276 |
| 11,606,795 | B2* | 3/2023 | Saeki | H04W 72/0473 |
| 11,750,424 | B2* | 9/2023 | Toba | H04W 4/38 375/232 |
| 11,863,245 | B2* | 1/2024 | Uematsu | H04B 3/548 |
| 2003/0043900 | A1* | 3/2003 | Deas | H04B 3/145 375/234 |
| 2004/0005000 | A1* | 1/2004 | Shake | H04B 10/07953 375/228 |
| 2006/0182205 | A1 | 8/2006 | Draving et al. | |
| 2010/0008413 | A1* | 1/2010 | Yamazaki | H04L 7/02 375/232 |
| 2010/0142611 | A1* | 6/2010 | Biman | H03F 3/45197 375/233 |
| 2011/0188566 | A1* | 8/2011 | Beukema | H04L 25/03057 375/233 |
| 2011/0235694 | A1* | 9/2011 | Stephens | G01R 31/31709 375/226 |
| 2012/0086470 | A1* | 4/2012 | Diffenderfer | H04L 25/0286 326/30 |
| 2012/0112849 | A1* | 5/2012 | Ikeda | H04B 3/02 333/32 |
| 2013/0207234 | A1* | 8/2013 | Ikeda | H04L 25/02 257/536 |
| 2015/0381340 | A1* | 12/2015 | Pandey | H04B 3/00 375/257 |
| 2016/0374091 | A1* | 12/2016 | Saeki | H04W 52/42 |
| 2017/0207952 | A1* | 7/2017 | Ogawa | H04L 41/14 |
| 2017/0220492 | A1* | 8/2017 | Ikeda | G11C 29/50008 |
| 2018/0269875 | A1* | 9/2018 | Greeff | H04L 25/0286 |
| 2019/0013809 | A1* | 1/2019 | Greeff | H03K 5/1534 |
| 2019/0073330 | A1* | 3/2019 | Ikeda | G06F 12/06 |
| 2019/0327745 | A1* | 10/2019 | Saeki | H04L 25/0288 |
| 2020/0280990 | A1* | 9/2020 | Saeki | H04W 72/0473 |
| 2021/0377946 | A1* | 12/2021 | Saeki | H04W 72/0473 |
| 2022/0029866 | A1* | 1/2022 | Toba | H04W 4/40 |
| 2022/0190874 | A1* | 6/2022 | Uematsu | H04L 25/03885 |
| 2022/0231891 | A1* | 7/2022 | Arai | H04L 25/03878 |
| 2022/0278665 | A1* | 9/2022 | Uematsu | H03H 7/0153 |
| 2022/0354006 | A1* | 11/2022 | Nakamura | H05K 1/181 |
| 2023/0216540 | A1* | 7/2023 | Uematsu | H04B 3/46 375/257 |
| 2023/0232392 | A1* | 7/2023 | Saeki | H04W 72/0473 375/257 |
| 2023/0239182 | A1* | 7/2023 | Ikeda | H04B 3/46 375/229 |
| 2023/0273251 | A1* | 8/2023 | Shimomura | H04B 3/46 702/59 |
| 2024/0030926 | A1* | 1/2024 | Xavier | H04L 25/242 |
| 2024/0080979 | A1* | 3/2024 | Hamamoto | H05K 1/115 |

FOREIGN PATENT DOCUMENTS

| | | |
|---|---|---|
| JP | 2015-115850 A | 6/2015 |
| JP | 2017-129969 A | 7/2017 |
| WO | WO-2008/117441 A1 | 10/2008 |

OTHER PUBLICATIONS

Extended European Search Report issued in corresponding EP Application No. 21826563.5, dated Jun. 7, 2024 (8 pages).

* cited by examiner

FIG. 3
| NUMBER OF SAMPLINGS | EYE PATTERN |
|---|---|
| 2 | 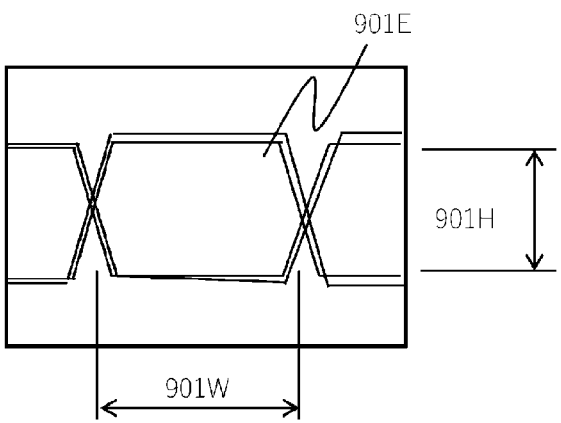 |
| MULTIPLE | 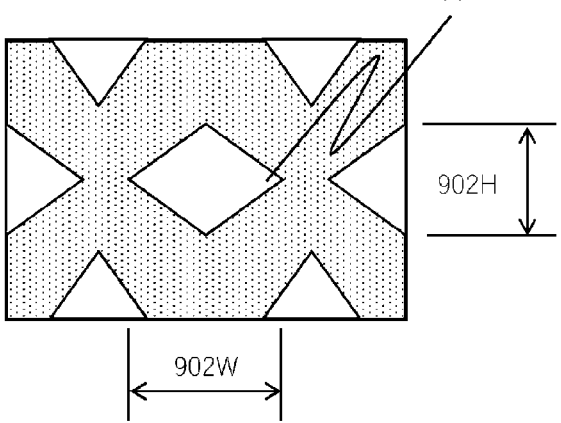 |

ELECTRONIC CONTROL DEVICE AND DETERMINATION METHOD

TECHNICAL FIELD

The present invention relates to an electronic control device and a determination method.

BACKGROUND ART

In electronic control devices for automatic driving and advanced driving support systems, driving control by sensors is required. As the speed of a data signal from a sensor increases, deterioration of signal quality due to deterioration of a transmission line becomes apparent. Among them, it is necessary to realize highly reliable communication between a sensor and an ECU, and a technique for performing communication quality diagnosis by comparing a data transmission variable with a diagnostic criterion is known. PTL 1 discloses a diagnostic apparatus including: a collection unit that collects a data transmission variable set by a characteristic of a data transmission line from a transmission and reception device on a diagnosis target path; and a diagnosis unit that diagnoses the diagnosis target path by referring to diagnostic criterion information configured by associating a value of the data transmission variable with quality determination information based on the collected data transmission variable.

CITATION LIST

Patent Literature

PTL 1: JP 2017-129969 A

SUMMARY OF INVENTION

Technical Problem

The invention disclosed in PTL 1 does not consider variations among products.

Solution to Problem

According to a first aspect of the present invention, an electronic control device includes a receiving unit that receives a data signal from an external device via a transmission line, a determination criterion selection unit that determines a determination criterion based on transition information of a waveform in the data signal, and a condition determination unit that determines a condition of a communication system including the external device, the receiving unit, and the transmission line based on a transmission waveform characteristic in the data signal and the determination criterion.

According to a second aspect of the present invention, there is provided a determination method performed by a computer including a receiving unit that receives a data signal from an external device via a transmission line. The determination method includes determining a determination criterion based on transition information of a waveform in the data signal, and determining a condition of a communication system including the external device, the receiving unit, and the transmission line based on a transmission waveform characteristic in the data signal and the determination criterion.

Advantageous Effects of Invention

According to the present invention, it is possible to perform diagnosis corresponding to variations in characteristics of the entire communication system including devices and transmission lines related to transmission and reception. Objects, configurations, and advantageous effects other than those described above will be clarified by the descriptions of the following embodiments.

BRIEF DESCRIPTION OF DRAWINGS

FIG. 3 is a diagram illustrating an eye pattern.

DESCRIPTION OF EMBODIMENTS

Figure 1:
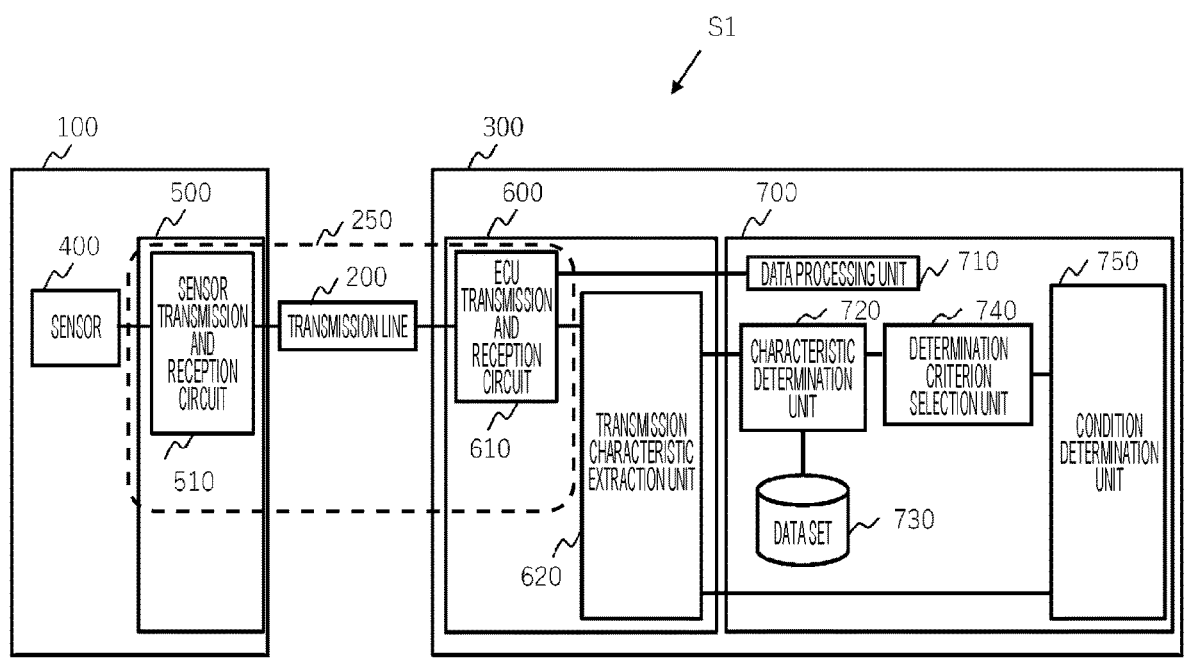
FIG. 1 is a configuration diagram of a signal transmission system according to a first embodiment.

Hereinafter, embodiments of the present invention will be described with reference to the drawings. Examples are for describing the present invention, and are omitted and simplified as appropriate for clarity of description. The present invention can be implemented in various other forms. Unless otherwise specified, each component may be singular or plural.

Positions, sizes, shapes, ranges, and the like of the components illustrated in the drawings may not represent actual positions, sizes, shapes, ranges, and the like in order to facilitate understanding of the invention. Therefore, the present invention is not necessarily limited to the positions, sizes, shapes, ranges, and the like illustrated in the drawings. Examples of various types of information may be described in terms of expressions such as "table", "list", and "queue", but various types of information may be expressed in a data structure other than the above expressions. For example, various types of information such as "XX table", "XX list", and "XX queue" may be "XX information". In describing identification information, expressions such as "identification information", "identifier", "name", "ID", and "number" are used, but the expressions can be replaced with each other.

In a case where there is a plurality of components having the same or similar functions, the same reference signs may be denoted with different subscripts for description. In addition, in a case where it is not necessary to distinguish the plurality of components, the description may be made by omitting the subscript. In the embodiments, processing performed by executing a program may be described. Here, the computer executes a program by a processor (for example, a CPU and a GPU), and performs processing defined by the program using a storage resource (for example, a memory), an interface device (for example, a communication port), and the like. Therefore, the subject of the processing performed by executing the program may be a processor. Similarly, the subject of the processing performed by executing the program may be a controller, a device, a system, a computer, or a node having a processor. The subject of the processing performed by executing the program may be an arithmetic unit, and may include a dedicated circuit that performs specific processing. Here, the dedicated circuit is, for example, a field programmable gate array (FPGA), an application specific integrated circuit (ASIC), a complex programmable logic device (CPLD), or the like.

The program may be installed on the computer from a program source. The program source may be, for example, a program distribution server or a computer-readable storage medium. In a case where the program source is a program distribution server, the program distribution server may include a processor and a storage resource that stores a distribution target program, and the processor of the program distribution server may distribute the distribution target program to another computer. In the embodiments, two or more programs may be implemented as one program, or one program may be implemented as two or more programs.

First Embodiment

A signal transmission system according to a first embodiment will be described below with reference to FIGS. 1 to 6.

Configuration

FIG. 1 is a configuration diagram of a signal transmission system S1 in the first embodiment. The place where the signal transmission system S1 is installed is not particularly limited, but in the present embodiment, the configuration assuming that the signal transmission system S1 is installed in a vehicle will be described. The signal transmission system S1 includes a sensor module 100 incorporating a sensor 400, an ECU 300 which is an electronic control device (electronic control unit), and a transmission line 200 connecting the sensor module 100 and the ECU 300. The sensor module 100 includes the sensor 400 and a sensor communication LSI 500 which is a large scale integration (LSI) for communication. The sensor communication LSI 500 includes a sensor transmission and reception circuit 510 that communicates with the ECU 300.

The ECU 300 includes an ECU communication LSI 600 and a data processing LSI 700. The ECU communication LSI 600 includes an ECU transmission and reception circuit 610 that communicates with the sensor module 100, and a transmission characteristic extraction unit 620 that extracts a characteristic of a transmission waveform of a sensing signal transmitted to the ECU transmission and reception circuit 610. The data processing LSI 700 includes a data processing unit 710, a characteristic determination unit 720, a determination criterion selection unit 740, and a condition determination unit 750. In addition, the data processing LSI 700 includes a non-volatile storage device (not illustrated), and a data set 730 is stored in the storage device.

The data processing LSI 700 includes a CPU (not illustrated) which is a central arithmetic unit, a ROM (not illustrated) which is a read-only storage device, and a RAM (not illustrated) which is a readable and writable storage device. The CPU loads the program stored in the ROM into the RAM and executes the program, and thus realizes the data processing unit 710, the characteristic determination unit 720, the determination criterion selection unit 740, and the condition determination unit 750. However, the data processing LSI 700 may implement the above functions by using a field programmable gate array (FPGA), which is a rewritable logic circuit, or an application specific integrated circuit (ASIC), which is an application specific integrated circuit, instead of a combination of the CPU, the ROM, and the RAM.

Sensing data obtained by sensing of the sensor 400 is transmitted to the sensor communication LSI 500. The data is received by the sensor transmission and reception circuit 510 in the sensor communication LSI 500 and transmitted to the transmission line 200 as a sensing signal. The sensing signal reaches the ECU 300 via the transmission line 200 and is input to the ECU communication LSI 600. The sensing signal received by the ECU transmission and reception circuit 610 in the LSI 600 is transmitted to the data processing unit 710 of the data processing LSI 700. Note that, although the transmission line of the sensing signal from the sensor 400 to the data processing unit 710 has been described, a control signal is also transmitted from the data processing unit 710 to the sensor 400.

The transmission characteristic extraction unit 620 acquires transmission characteristic information such as waveform information and equalizer information of the ECU transmission and reception circuit 610, and transmits the transmission characteristic information to the condition determination unit 750. The equalizer information is a feed forward equalizer (FFE), a continuous time linear equalizer (CLTE), a decision feedback equalizer (DFE), or the like. In addition, the equalizer information also includes a loss compensation coefficient which is a coefficient used for calculation of the ECU transmission and reception circuit 610 in order to compensate for a loss of a communication signal between the sensor communication LSI 500 and the ECU communication LSI 600. Further, the transmission characteristic extraction unit 620 also has a function of obtaining transition information of a transmission waveform to be described later.

The data processing unit 710 performs original processing of the ECU 300 by using the output of the sensor 400. The processing contents of the data processing unit 710 are not particularly limited. For example, the data processing unit 710 detects another vehicle from an image captured and obtained by the sensor 400 as a camera, estimates the distance to the detected vehicle, and transmits the estimated distance to another ECU.

The characteristic determination unit 720 classifies the characteristics of a communication system 250 including the sensor transmission and reception circuit 510, the transmission line 200, and the ECU transmission and reception circuit 610 into any one of SS which is the minimum value of an operation speed, TT which is the representative value, and FF which is the maximum value of the operation speed. The operation of the characteristic determination unit 720 will be described in detail later.

Based on the classification by the characteristic determination unit 720, the determination criterion selection unit 740 determines a determination criterion with reference to the data set 730 and transmits the determination criterion to the condition determination unit 750. The determination criterion selection unit 740 may write the determined determination criterion in a predetermined position of a storage device (not illustrated). The operation of the condition determination unit 750 will be described in detail later. The operation frequencies of the characteristic determination unit 720 and the determination criterion selection unit 740 are relatively low, and are, for example, when a vehicle on which the signal transmission system S1 is mounted is shipped from a factory or when at least one of the sensor module 100, the transmission line 200, and the ECU 300 is replaced after shipment.

The condition determination unit 750 determines whether or not the characteristics of the communication system 250 are deteriorated, by comparing the determination criterion transmitted from the determination criterion selection unit 740 with an equalizer coefficient that will be described later and is transmitted from the transmission characteristic extraction unit 620. Note that, the determination criterion is also referred to as a "threshold value" below, and the equalizer coefficient is also referred to as a "loss compensation coefficient" below. The operation frequency of the condition determination unit 750 is higher than that of the determination criterion selection unit 740 and the like, and is, for example, every hour, every day, every month, or every inspection of the vehicle on which the signal transmission system S1 is mounted. When the condition determination unit 750 determines that the characteristics of the communication system 250 are deteriorated, the condition determination unit 750 may notify the data processing unit 710 of a message or transmit the message to another ECU.

Relationship Between Characteristic Variation and Condition Determination

Figure 2:
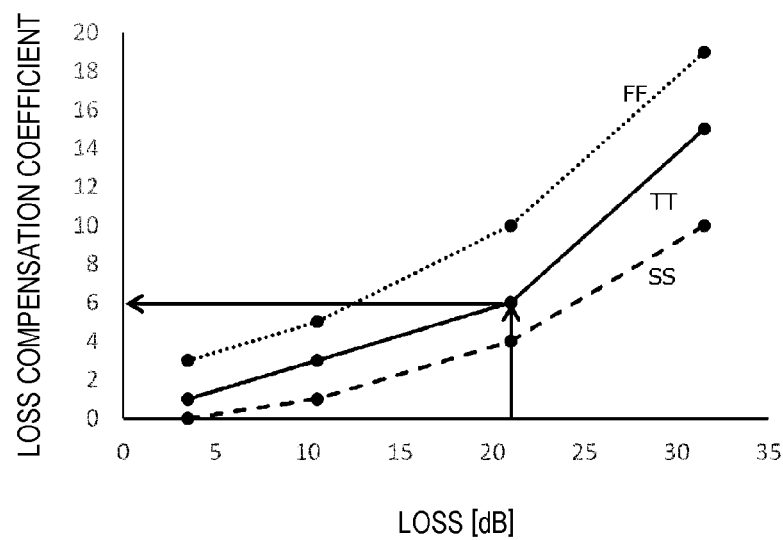
FIG. 2 is a diagram illustrating a relationship between a loss and a compensation coefficient of a communication system.

Before describing each function in detail, the influence of variations in characteristics of the communication system 250 on abnormality detection will be described. FIG. 2 is a diagram illustrating a relationship between a loss and a compensation coefficient of the communication system 250 under a condition where a power supply voltage and a temperature are constant. The graph illustrated in FIG. 2 is obtained by, for example, preliminary calculation or preliminary experiment on a large number of signal transmission systems S1 having the same model number. The horizontal axis in FIG. 2 indicates the magnitude of the loss of the communication system 250, and the loss is larger toward the right side in the drawing. In FIG. 2, the vertical axis indicates the magnitude of the loss compensation coefficient of an equalizer provided in the ECU transmission and reception circuit 610, and the loss compensation coefficient is larger toward the upper portion in the drawing. The ECU transmission and reception circuit 610 shapes the signal waveform so as to be AD-converted without errors by setting the loss compensation coefficient to be larger as the loss of the communication system 250 is larger. Therefore, in FIG. 2, all the loss compensation coefficients have a tendency of right shoulder upward.

As described above, the condition determination unit 750 detects the characteristics of the communication system 250 with a light processing load by monitoring the loss correction coefficient. Here, there is a problem that the relationship between the loss correction coefficient and the loss varies for each system. For example, when the value "6" of the loss correction coefficient is set as the threshold value, the loss of 21 dB is set as the threshold value in the case of TT as a standard product. However, even when the value of the same loss correction coefficient is "6", the loss is 13 dB when the characteristic is FF, and the loss is 25 dB when the characteristic is SS, and there is a large variation. Even in this case, if it is a requirement to perform detection when the loss deteriorates to 12 dB or more, it is certain that detection can be performed since all of 13, 21, and 25 are equal to or more than 12. However, excessive quality is required, which is not economical.

Therefore, in the present embodiment, characteristics of the communication system 250 are determined as initial processing, and an appropriate threshold value of the loss compensation coefficient is set. Such processor processing is performed by the transmission characteristic extraction unit 620, the characteristic determination unit 720, and the determination criterion selection unit 740. Then, in the subsequent normal processing, the threshold value set by the condition determination unit 750 is compared with the loss compensation coefficient output by the transmission characteristic extraction unit 620 each time.

Discrimination of Characteristics

FIG. 3 is a diagram illustrating an eye pattern generally used to evaluate transmission characteristics of a communication line, in which the horizontal axis indicates the time and the vertical axis indicates the voltage. The eye pattern is, so to speak, obtained by overwriting a large number of waveforms of the received signal. In the present embodiment, the number of times of the overwriting is referred to as a "sampling number". The upper part of FIG. 3 illustrates a case where the sampling number is 2, and the lower part of FIG. 3 illustrates a case where the sampling number is very large. In the eye pattern, the dimensions of an opening portion are an important indicator. The opening portion is a hexagonal region indicated by the reference sign 901E in the upper part of FIG. 3, and a diamond-shaped region indicated by the reference numeral 902E in the lower part of FIG. 3.

As is clear from the comparison between the upper part and the lower part of FIG. 3, even in the case of using the same communication system, the opening portion becomes narrower as the number of times of overwriting increases. Therefore, in general, the sampling number is designated in the evaluation of the eye pattern. For example, the condition of the eye pattern is designated as "that the sampling number is 10 to the power of 12, the width 902W of the opening portion 902E is equal to or more than T1 seconds, and the height 902H is equal to or more than T2 V". At this time, there is a problem that the test takes a long time when a very large sampling number is required. The present embodiment has been solved by the following method.

Figure 4:
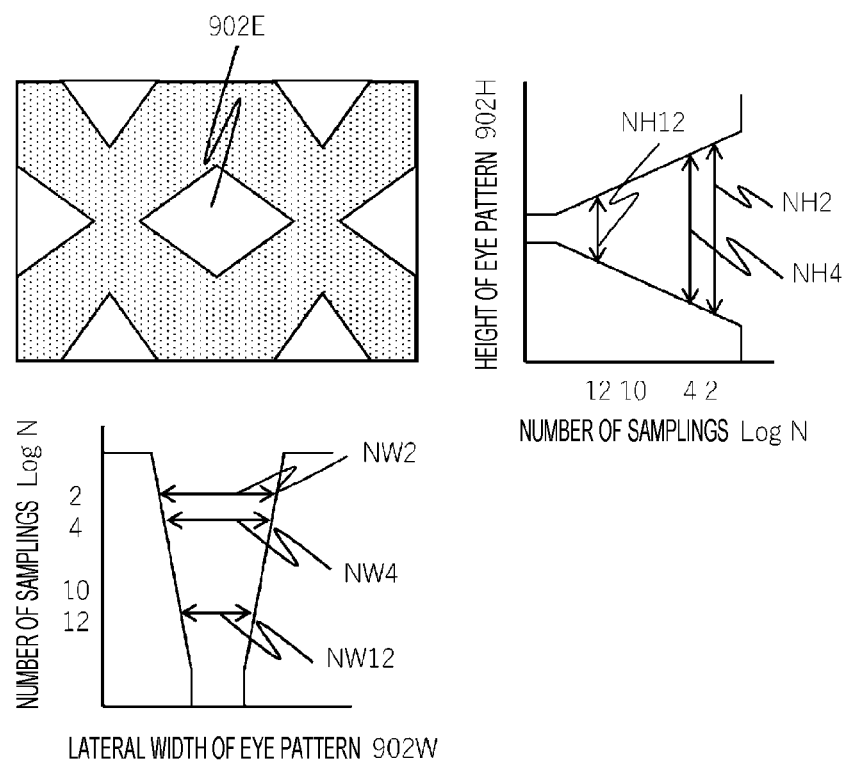
FIG. 4 is a conceptual diagram illustrating estimation of an opening portion of the eye pattern.

FIG. 4 is a conceptual diagram illustrating estimation of the opening portion of the eye pattern. FIG. 4 includes a diagram illustrating an eye pattern illustrated in the upper left, an estimation diagram of the width 902W illustrated in the lower left, and an estimation diagram of the height 902H illustrated in the upper right. In FIG. 4, the sampling number of the eye pattern is represented by a variable "N". As a result of intensive studies, the inventors of the present application have found that the width 902W and the height 902H of the eye pattern have a correlation with the sampling number "N". "Log" shown in each graph of FIG. 4 is the common logarithm, that is, the base is 10. Note that the two estimation diagrams illustrated in FIG. 4 are also referred to as "bathtub curves" because of the similar shapes.

The estimation diagram of the width 902W illustrated at the lower left of FIG. 4 indicates that the width 902W is NW2 when the sampling number N is the square of 10, that is, 100 times, the width 902W is NW4 when the sampling number N is the fourth power of 10, that is, 10,000 times, and the width 902W is NW12 when the sampling number N is the twelfth power of 10. The estimation diagram of the height 902H illustrated at the upper right of FIG. 4 indicates that the height 902H is NH2 when the sampling number N is the square of 10, that is, 100 times, the height 902H is NH4 when the sampling number N is the fourth power of 10, that is, 10,000 times, and the height 902H is NH12 when the sampling number N is the twelfth power of 10.

In the present embodiment, the slope of the illustrated straight line is estimated with a small number of samplings, and the width and the height of the opening portion of the eye pattern are calculated with a large number of samplings. For example, even in a case where the eye pattern of the sampling number 10 to the power of 12 is evaluated, the width and the height of the eye pattern of the sampling number 10 to the power of 12 are calculated by actually creating only the eye patterns of the sampling number 10 to the power of 2 and the sampling number 10 to the power of 4. In the example illustrated in FIG. 4, approximation is performed by a linear function, but approximation may be performed by a quadratic function.

Figure 5:
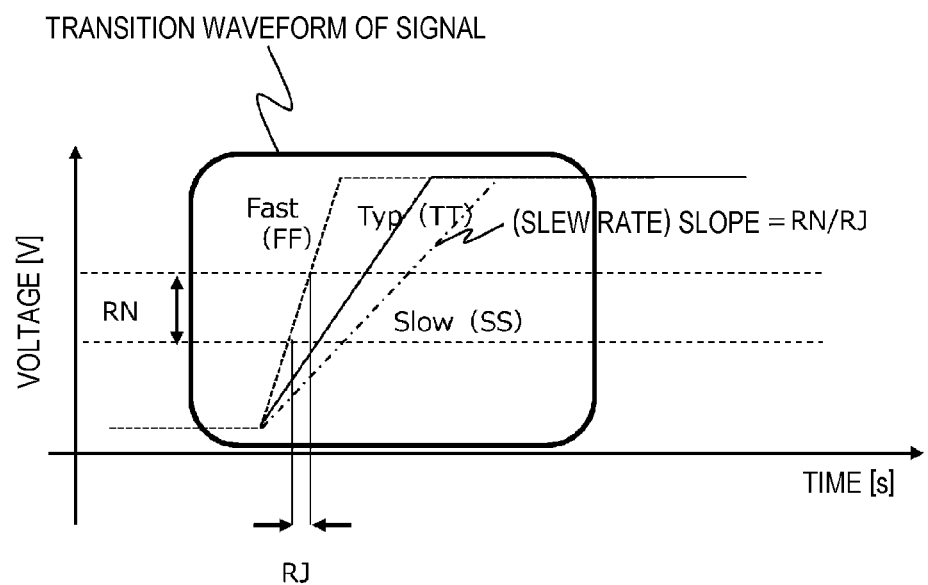
FIG. 5 is a diagram illustrating determination of characteristics of a communication system.

FIG. 5 is a diagram illustrating determination of characteristics of the communication system. Each of the width and the height of the opening portion of the eye pattern corresponds to the magnitude of each of random jitter (RJ) and random noise (RN). The ratio are slew rates that determine characteristics of the communication system. Specifically, the slew rate is calculated as RN/RJ. The data set 730 is, for example, a combination of the characteristic and the slew rate, and is specifically information of "SS is 0.8, TT is 1.0, and FF is 1.2". The characteristic determination unit 7720 determines the characteristic of the communication system 250 by comparing the calculated slew rate with the information described in the data set 730. Note that the slew rate is also referred to as "transition information of a transmission waveform".

Note that, in the above-described characteristic determination processing of the communication system 250, the transmission characteristic extraction unit 620 performs processes up to calculation of the slew rate, and the characteristic determination unit 720 only determines the characteristic. In addition, the data signal used for the transmission characteristic extraction unit 620 to evaluate the eye pattern with a small sampling number may be a signal specially prepared to evaluate the system characteristics, but may be any signal passing through the transmission line 200 such as the sensing signal output by the sensor 400.

Selection of Determination Criterion

The data set 730 stores a loss threshold value determined in advance and information indicating the relationship between the loss and the loss compensation coefficient for each characteristic illustrated in FIG. 2. When the characteristic determination unit 720 selects the characteristic of the communication system 250, the determination criterion selection unit 740 determines the threshold value with reference to the data set 730. For example, when the predetermined loss threshold value is 21 dB, the threshold value is determined to be "6" when the characteristic is TT, the threshold value is determined to be "4" when the characteristic is SS, and the threshold value is determined to be "10" when the characteristic is FF.

Flowchart

Figure 6:
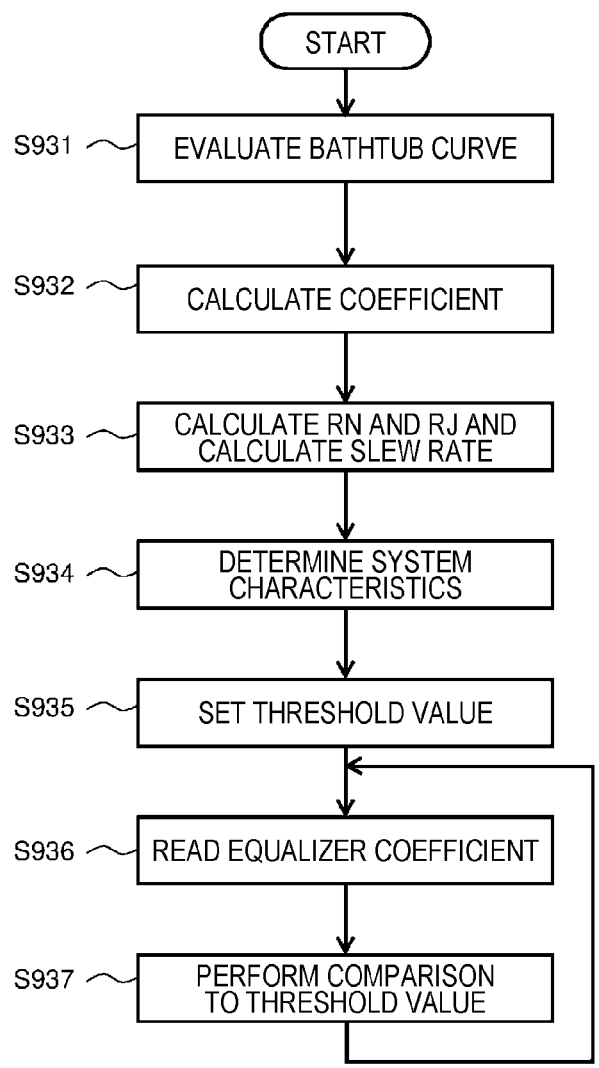
FIG. 6 is a flowchart illustrating an operation of the signal transmission system in the first embodiment.

FIG. 6 is a flowchart illustrating the operation of the signal transmission system S1. Among the following steps described below, Steps S931 to S935 are initial processing, and Steps S936 to S937 are normal processing. In addition, the flowchart is described to clearly indicate the context of each process, and does not indicate that each process is continuous in time series. In particular, there may be an interval of several days, months or years between the initial processing and the normal processing.

In Step S931, the transmission characteristic extraction unit 620 evaluates the bathtub curve. Specifically, the transmission characteristic extraction unit 620 creates an eye pattern with a small sampling number, for example, 100 times and 10,000 times, and evaluates the lateral width and the height of the opening portion. Then, in Step S932, the transmission characteristic extraction unit 620 calculates the slopes of the two graphs illustrated in FIG. 4, that is, the coefficients of the approximation straight lines. In subsequent Step S932, the transmission characteristic extraction unit 620 calculates the width 902 W and the height 902 H of the eye pattern at the prescribed sampling number by using the coefficients calculated in Step S932. Further, the transmission characteristic extraction unit 620 calculates a slew rate which is a ratio between the width 902W and the height 902H.

Then, in Step S934, the characteristic determination unit 720 determines the characteristic of the system with reference to the data set 730. For example, the characteristic determination unit 720 selects a characteristic having a value closest to the calculated slew rate. Then, in Step S935, the determination criterion selection unit 740 determines a threshold value with reference to the data set 730 based on the characteristic determined by the characteristic determination unit 720. Then, in Step S936, the condition determination unit 750 reads the equalizer coefficient set in the ECU transmission and reception circuit 610 from the transmission characteristic extraction unit 620. Then, in Step S937, the condition determination unit 750 evaluates the system by comparing the threshold value set in Step S935 with the equalizer coefficient read in Step S936.

Specifically, the condition determination unit 750 determines that an abnormality has occurred when the equalizer coefficient read in Step S936 is greater than the threshold value, and determines to be normal when the equalizer coefficient read in Step S936 is equal to or smaller than the threshold value. When the process of Step S937 is completed, the condition determination unit 750 returns to Step S936. Note that the execution of Step S936 may be started on condition that a predetermined signal is input from the outside. That is, the normal processing in Steps S936 to S937 may be started when the initial processing in Steps S931 to S935 has completed and the predetermined signal is input from the outside.

According to the first embodiment described above, it is possible to obtain the following operational effects.

(1) The ECU 300, which is an electronic control device, includes the ECU transmission and reception circuit 610 that receives a data signal from the sensor module 100, which is an external device, via the transmission line 200, the determination criterion selection unit 740 that determines the determination criterion, that is, the threshold value with reference to the data set 730 based on the transition information of the waveform in the data signal, that is, the slew rate, and the condition determination unit 750 that determines the condition of the communication system 250 based on the transmission waveform characteristic in the data signal, that is, the loss compensation coefficient of the equalizer and the threshold value. Therefore, the ECU 300 can perform diagnosis corresponding to variations in characteristics of the devices related to transmission and reception, that is, the communication system 250 including the sensor module 100, the ECU 300, and the transmission line 200. Accordingly, it is possible to improve the diagnosis accuracy. In other words, in the present embodiment, by setting the threshold value in accordance with the characteristics of the communication system 250, it is possible to obtain the same diagnosis accuracy as in the case where the variation in the characteristics of the communication system 250 is small.

Note that, the device variation is generally PVT (process, power supply voltage, and temperature). However, in the present embodiment, by setting an allowable range in diagnosis for the power supply voltage and the temperature, the variation is suppressed and the diagnosis accuracy is secured. In the determination method in the present embodiment, the characteristics of the transmission line from the sensor communication LSI 500 to the ECU communication LSI 600 are also included. Therefore, for example, when a board, a connector, a cable, a relay connector, and the like are used for the transmission line 200, transition information of a data transmission waveform affected by these characteristics can be acquired. Therefore, the determination criterion including process information of the device related to communication can be selected.

(2) The transmission waveform characteristic in the data signal is an equalizer waveform adjustment setting value for adjusting the waveform of the data signal, that is, the loss compensation coefficient. The condition determination unit 750 determines the condition of the communication unit based on the transmission waveform characteristics and the determination criterion.

(3) The ECU 300 includes the transmission characteristic extraction unit 620 that uses the eye pattern at the first sampling number N1 and the eye pattern at the second sampling number N2 to estimate the characteristics of the eye pattern at the third sampling number N3 and calculate the transition information of the waveform. N1 is, for example, 10 to the power of 2, and N2 is, for example, 10 to the power of 4. N3 is, for example, 10 to the power of 12, and N3 is greater than N1 and N2. Therefore, it is possible to determine the characteristics of the communication system 250 in a short time in the initial processing.

Modification Example 1

In the first embodiment, attention is paid to the loss correction coefficient of the equalizer, which is processing of shaping a signal when the ECU 300 is on the communication reception side. However, a similar method may be applied to shaping of a signal when the ECU 300 is on the transmission side, that is, pre-emphasis or de-emphasis. In other words, not only in a case where the ECU 300 is on the reception side, but also in a case where the ECU is on the transmission side, it is possible to obtain the same operational effect as those of the first embodiment.

According to Modification example 1, it is possible to obtain the following operational effects.

(4) The transmission waveform characteristics in the data signal also include setting values of pre-emphasis and de-emphasis for adjusting the waveform of the data signal. Therefore, the ECU 300 can perform diagnosis similar to that in the first embodiment not only when receiving data but also when transmitting data.

Modification Example 2

Figure 7:
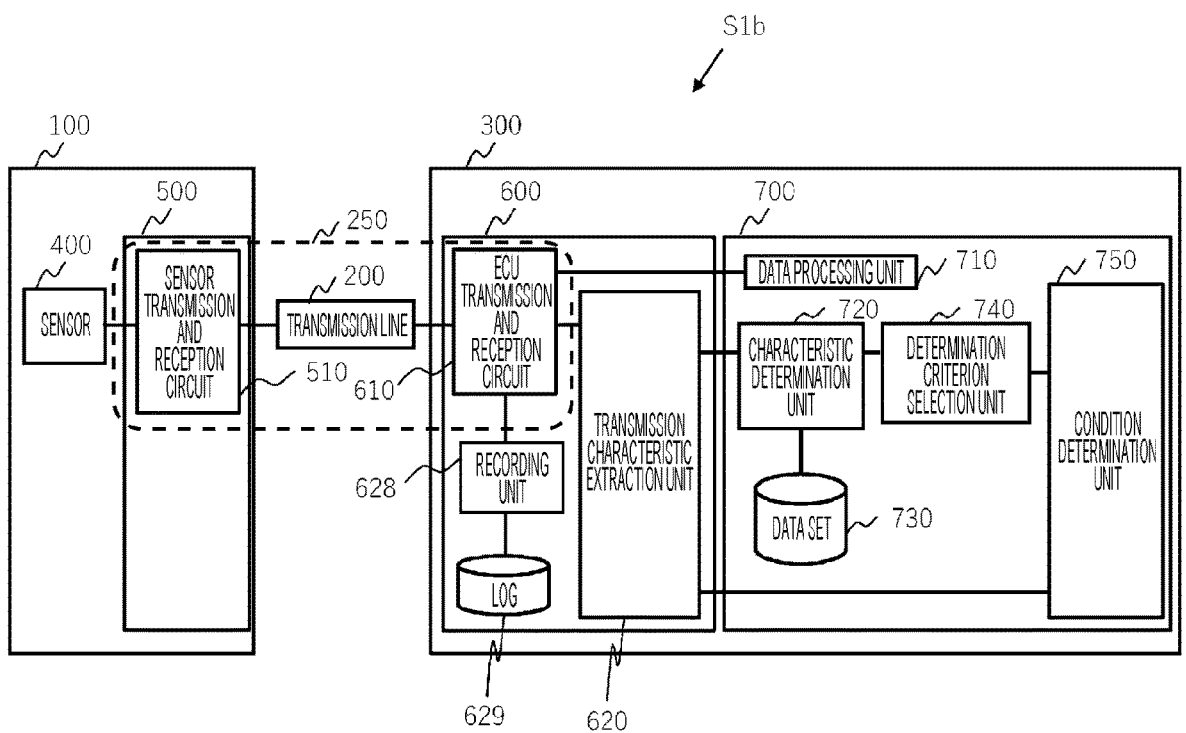
FIG. 7 is a diagram illustrating a configuration of a signal transmission system in Modification Example 2.

FIG. 7 is a diagram illustrating a configuration of a signal transmission system S1b according to Modification Example 2. In the present modification example, the ECU communication LSI 600 further includes a recording unit 628 that records the loss correction coefficient. The recording unit 628 acquires the loss correction coefficient from the ECU transmission and reception circuit 610 and records the loss correction coefficient as a log 629. The log 629 is recorded in a non-volatile storage device (not illustrated).

According to Modification Example 2, it is possible to obtain the following operational effects.

(5) The ECU 300 includes the recording unit 628 that stores log data of the transmission waveform characteristic related to the data signal. Therefore, it is possible to use the log data for post-analysis.

Modification Example 3

The transition information of the transmission waveform obtained by the transmission characteristic extraction unit 620 may include information of overshoot and undershoot. In this case, the characteristics of the communication system 250 may be specified from overshoot or undershoot information, that is, voltage values or time information.

Modification Example 4

When process determination is performed from the transition information of the transmission waveform, process information may be determined by classifying the value of the slew rate without using the data set 730.

Modification Example 5

The transmission characteristic extraction unit 620 may directly acquire the process information of the sensor transmission and reception circuit 510 of the sensor module 100 and the process information of the ECU transmission and reception circuit 610 from the outside, or may perform determination of the process information and communication quality diagnosis by utilizing a technique such as machine learning or AI.

Modification Example 6

In the first embodiment described above, the characteristics of the communication system 250 are classified into three types. However, the number of classifications is not limited to three, and may be two or more. In addition, the determination criterion selection unit 740 selects one of the three threshold values in the communication system 250 based on the value of the slew rate, but an intermediate value may be used as the threshold value by a method such as proportional complementation.

Second Embodiment

A signal transmission system according to a second embodiment will be described with reference to FIGS. 8 and 9. In the following description, the same components as those of the first embodiment are denoted by the same reference signs, and differences will be mainly described. The points not specifically described are the same as those in the first embodiment. The present embodiment is different from the first embodiment mainly in consideration of the voltage and the temperature.

Figure 8:
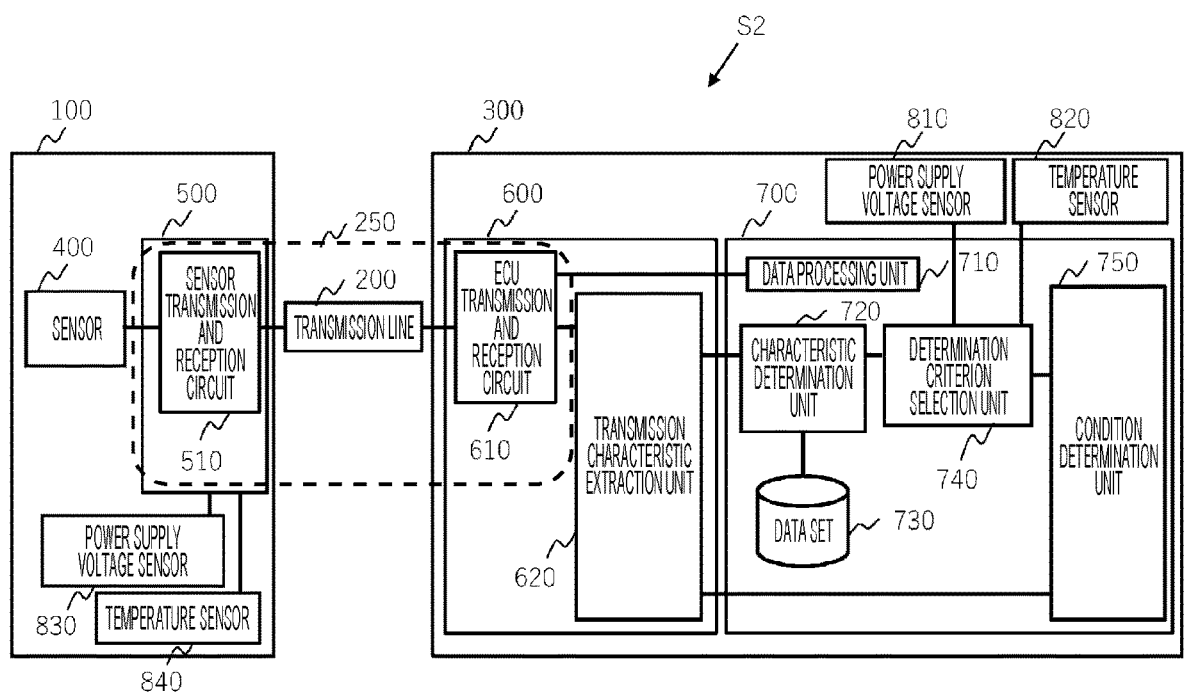
FIG. 8 is a configuration diagram of a signal transmission system according to a second embodiment.

FIG. 8 is a configuration diagram of a signal transmission system S2 in the second embodiment. In the signal transmission system S2, in addition to the configuration of the signal transmission system S1 in the first embodiment, the sensor module 100 further includes a power supply voltage sensor 830 and a temperature sensor 840, and the ECU 300 further includes a power supply voltage sensor 810 and a temperature sensor 820. Sensing signals of the power supply voltage sensors 810 and 830 and the temperature sensors 820 and 840 are input to the determination criterion selection unit 740 of the ECU 300. In addition, the data set 730 in the present embodiment stores information indicating the relationship between the loss and the loss compensation coefficient, which corresponds to each combination of the power supply voltage and the temperature for each characteristic of SS, TT, and FF of the communication system 250.

The determination criterion selection unit 740 in the present embodiment determines the threshold value by using not only the characteristics of the communication system 250 determined by the characteristic determination unit 720 but also information of the power supply voltage and the temperature. That is, in the present embodiment, the determination criterion selection unit 740 sets the threshold value not only once as the initial processing but also every time the condition determination unit 750 performs determination, according to the power supply voltage and the temperature.

Figure 9:
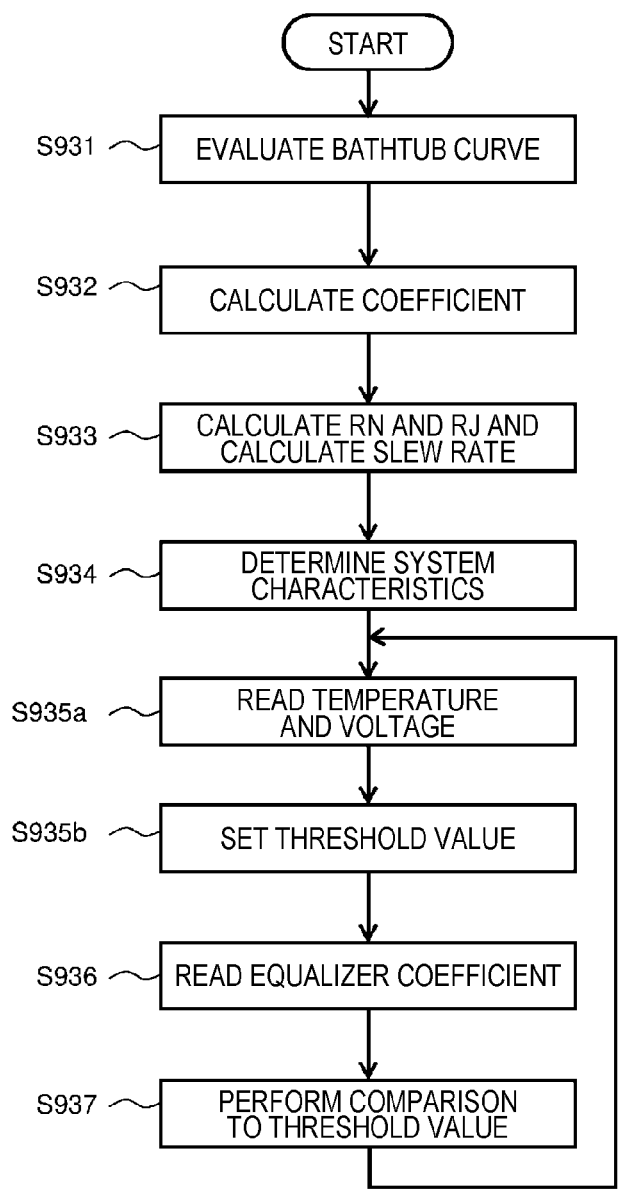
FIG. 9 is a flowchart illustrating an operation of the signal transmission system in the second embodiment.

FIG. 9 is a flowchart illustrating an operation of the signal transmission system S2 in the second embodiment. The same processes as those in the first embodiment are denoted by the same step numbers, and the description thereof will be omitted. In the second embodiment, Step S935a is executed after Step S934. In the second embodiment, Steps S931 to S934 are initial processing, and Steps S935a to S937 are normal processing.

In Step S935a, the determination criterion selection unit 740 reads the sensing signals of the power supply voltage sensors 810 and 830 and the temperature sensors 820 and 840, and reads the values of the voltage and the temperature. Then, in Step S935b, the determination criterion selection unit 740 refers to the data set 730 to set the corresponding loss compensation coefficient, that is, the threshold value based on the combination of the voltage and the temperature read in Step S935a and the predetermined loss threshold value. The threshold value is used in Step S937. The processes in Steps S936 and S937 are similar to those in the first embodiment. When the process of Step S937 is completed, the process proceeds to Step S935a.

According to the second embodiment described above, it is possible to obtain the following operational effects.

(6) The determination criterion selection unit 740 of the ECU 300 determines the determination criterion based on the power supply voltage and the temperature information of the sensor module 100 and the ECU 100. Therefore, the information when the determination criterion is selected by the determination criterion selection unit 740 increases, and thus it is possible to perform highly accurate diagnosis.

Third Embodiment

A signal transmission system according to a third embodiment will be described with reference to FIG. 10. In the following description, the same components as those of the first embodiment are denoted by the same reference signs, and differences will be mainly described. The points not specifically described are the same as those in the first embodiment. The present embodiment is different from the first embodiment mainly in that a plurality of communication systems is evaluated.

Figure 10:
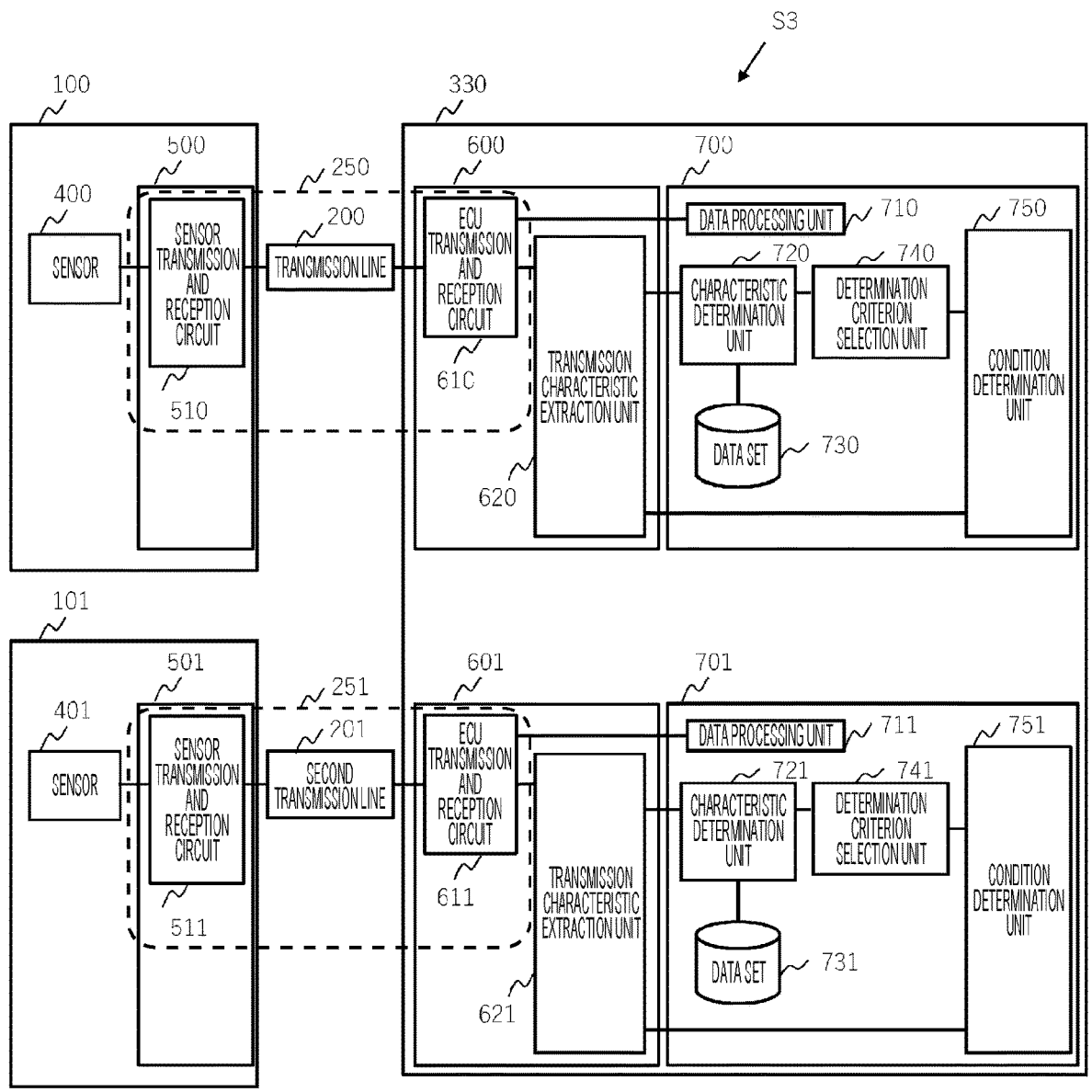
FIG. 10 is a configuration diagram of a signal transmission system according to a third embodiment.

FIG. 10 is a configuration diagram of a signal transmission system S3 according to the third embodiment. In the signal transmission system S3, in addition to the configuration of the signal transmission system S1 in the first embodiment, a second sensor module 101 is connected to an ECU 330 via a second transmission line 201. The ECU 330 further includes an ECU second communication LSI 601 and a second data processing LSI 701 in addition to the configuration of the first embodiment.

The second sensor module 101 includes a sensor 401 and a second sensor communication LSI 501, and the second sensor communication LSI 501 includes a sensor transmission and reception circuit 511. The ECU second communication LSI 601 includes an ECU transmission and reception circuit 611 and a transmission characteristic extraction unit 621. The second data processing LSI 701 includes a data processing unit 711, a characteristic determination unit 721, a determination criterion selection unit 741, and a condition determination unit 751. In the present embodiment, the sensor transmission and reception circuit 511, the second transmission line 201, and the ECU transmission and reception circuit 611 are collectively referred to as a second communication system 251.

The configuration and the operation of the ECU second communication LSI 601 are substantially the same as those of the ECU communication LSI 600. The configuration and the operation of the second data processing LSI 701 are substantially the same as those of the data processing LSI 700. However, the predetermined loss included in the data set 731 of the second data processing LSI 701 is a value corresponding to the second communication system 251.

According to the third embodiment described above, it is possible to obtain the following operational effects.

(7) The ECU 330 includes the ECU transmission and reception circuit 611 being a second receiving unit that receives a second data signal from a second sensor module 101 that is a second external device via a second transmission line 201, the determination criterion selection unit 741 that determines a second determination criterion based on transition information of a waveform in the second data signal, and the condition determination unit 751 that determines a condition of the second communication system 251 based on a transmission waveform characteristic in the second data signal and the second determination criterion. Therefore, since each sensor has the determination criterion selection unit, the transmission and reception circuit, and the transmission line, it is possible to perform diagnosis in each transmission system, and to specify an abnormal path after the diagnosis.

Fourth Embodiment

A signal transmission system according to a fourth embodiment will be described with reference to FIG. 11. In the following description, the same components as those of the first embodiment are denoted by the same reference signs, and differences will be mainly described. The points not specifically described are the same as those in the first embodiment. The present embodiment is different from the first embodiment mainly in that deterioration of a communication system is detected on the sensor side.

Figure 11:
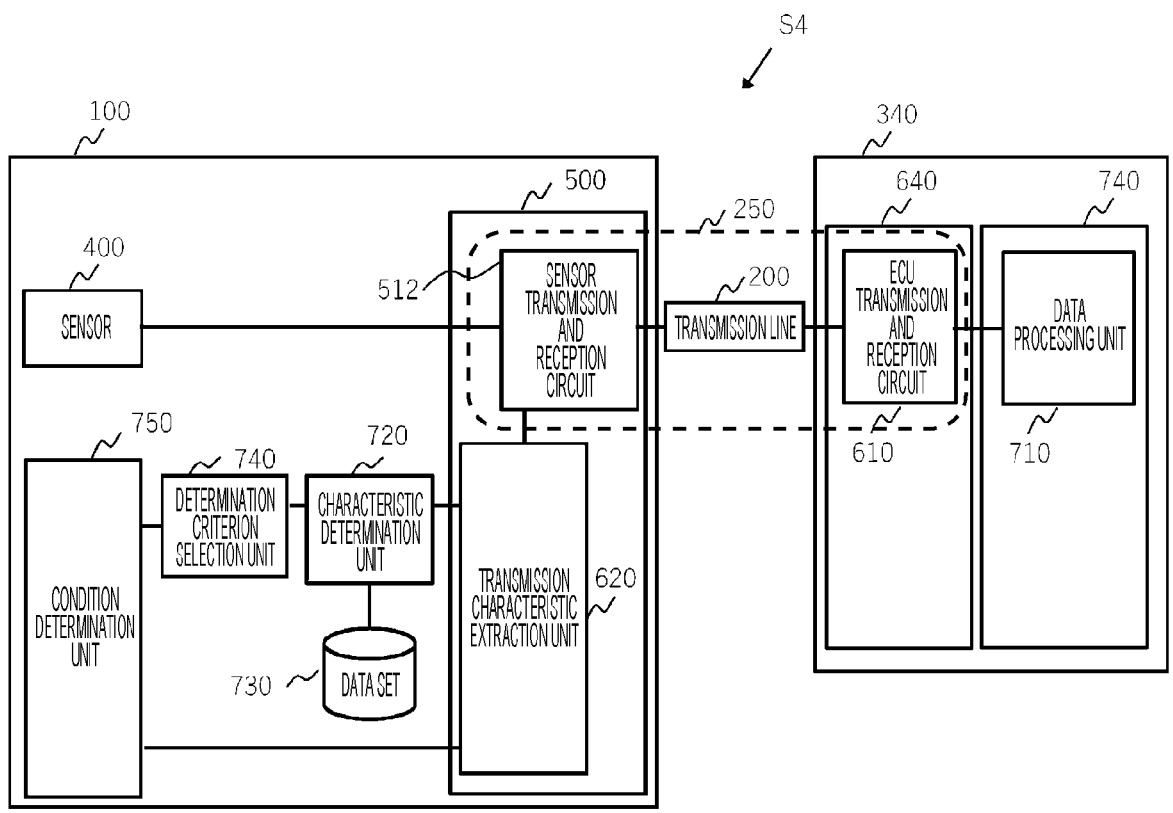
FIG. 11 is a configuration diagram of a signal transmission system according to a fourth embodiment.

FIG. 11 is a configuration diagram of a signal transmission system S4 according to the fourth embodiment. As compared with the signal transmission system S1 in the first embodiment, the transmission characteristic extraction unit 620, the characteristic determination unit 720, the data set 730, the determination criterion selection unit 740, and the condition determination unit 750 included in the ECU 300 are moved to a sensor module 140. However, since the operation of each configuration is similar to that of the first embodiment, the description thereof will be omitted.

According to the fourth embodiment described above, in addition to the effect of the first embodiment, since the communication diagnosis function is provided on the sensor side, it is possible to reduce the calculation load of the ECU 300. In addition, a communication state can be determined for a signal from the ECU 300 to the sensor module 100.

In the above-described embodiments and modification examples, the configuration of the functional block is merely an example. Some functional configurations illustrated as separate functional blocks may be integrally configured, or a configuration illustrated in one functional block diagram may be divided into two or more functions. In addition, some of the functions in each functional block may be included in another functional block.

In each of the above-described embodiments and modification examples, the program is stored in the ROM (not illustrated), but the program may be stored in a nonvolatile storage device. In addition, the ECU may include an input and output interface (not illustrated), and the program may be read from another device via the input and output interface and a medium that can be used by the ECU if necessary. Here, the medium refers to, for example, a storage medium detachable from the input and output interface, or a communication medium, that is, a wired, wireless, or optical network, or a carrier wave or a digital signal propagating through the network. Some or all of the functions implemented by the program may be implemented by a hardware circuit or an FPGA.

The above-described embodiments and modification examples may be combined. Although various embodiments and modification examples have been described above, the present invention is not limited to these contents. Other forms considered within the scope of the technical idea of the present invention are also included in the scope of the present invention.

REFERENCE SIGNS LIST 100 sensor module
200 transmission line
250 communication system
510 sensor transmission and reception circuit
610 ECU transmission and reception circuit
620 transmission characteristic extraction unit
628 recording unit
710 data processing unit
720 characteristic determination unit
730 data set
740 determination criterion selection unit
750 condition determination unit
810, 830 power supply voltage sensor
820, 840 temperature sensor

The invention claimed is:

1. An electronic control device comprising:
a receiving unit that receives a data signal from an external device via a transmission line;
a transmission characteristic extraction unit that uses an eye pattern at a first sampling number N1 and an eye pattern at a second sampling number N2 to estimate a characteristic of an eye pattern at a third sampling number N3 and calculate transition information of a waveform, wherein N3 is greater than N1 and N2;
a determination criterion selection unit that determines a determination criterion based on the transition information of the waveform in the data signal; and
a condition determination unit that determines a condition of a communication system including the external device, the receiving unit, and the transmission line based on a transmission waveform characteristic in the data signal and the determination criterion.

2. The electronic control device according to claim 1, wherein
the transmission waveform characteristic in the data signal is a waveform adjustment setting value of an equalizer or pre-emphasis that adjusts a waveform of the data signal, and
the condition determination unit determines a condition of a communication unit based on the transmission waveform characteristic and the determination criterion.

3. The electronic control device according to claim 1, further comprising
a recording unit that stores log data of the transmission waveform characteristic related to the data signal.

4. The electronic control device according to claim 1, wherein
the determination criterion selection unit determines the determination criterion based on power supply voltages and temperature information of the external device and the electronic control device.

5. The electronic control device according to claim 1, further comprising:
a second receiving unit that receives a second data signal from a second external device via a second transmission line;
a second determination criterion selection unit that determines a second determination criterion based on transition information of a waveform in the second data signal; and
a second condition determination unit that determines a condition of a second communication system including the second external device, the second receiving unit, and the second transmission line based on a transmission waveform characteristic in the second data signal and the second determination criterion.

6. A determination method performed by a computer including a receiving unit that receives a data signal from an external device via a transmission line, the determination method comprising:
using an eye pattern at a first sampling number N1 and an eye pattern at a second sampling number N2 to estimate a characteristic of an eye pattern at a third sampling number N3 and calculate transition information of a waveform, wherein N3 is greater than N1 and N2;
determining a determination criterion based on the transition information of the waveform in the data signal; and
determining a condition of a communication system including the external device, the receiving unit, and the transmission line based on a transmission waveform characteristic in the data signal and the determination criterion.

7. An electronic control device comprising:
a receiver that receives a data signal from an external device via a transmission line; and
a controller configured to
determine a determination criterion based on transition information of a waveform in the data signal, and based on power supply voltages and temperature information of each of the external device and the electronic control device; and
determine a condition of a communication system including the external device, the receiver, and the transmission line based on a transmission waveform characteristic in the data signal and the determination criterion.

\* \* \* \* \*